United States Patent [19]

Baker et al.

[11] Patent Number: 5,187,246

[45] Date of Patent: Feb. 16, 1993

[54] PROCESS FOR MAKING EPR RESINS

[75] Inventors: Edgar C. Baker, Bridgewater; Francis G. Stakem, Flemington; Allen Noshay, East Brunswick, all of N.J.; Kiu H. Lee, South Charleston; Arthur E. Marcinkowsky, Charleston, both of W. Va.

[73] Assignee: Union Carbide Chemicals & Plastics Technology Corporation, Danbury, Conn.

[21] Appl. No.: 544,547

[22] Filed: Jun. 26, 1990

[51] Int. Cl.$^5$ ............................ C08F 2/34; C08F 4/20; C08F 4/50

[52] U.S. Cl. .................................... 526/88; 526/113; 526/157; 526/339; 526/901

[58] Field of Search ................. 526/151, 901, 88, 113, 526/157, 339

[56]  References Cited

U.S. PATENT DOCUMENTS

| | | | |
|---|---|---|---|
| 3,582,987 | 6/1971 | Natta et al. | 260/93.5 |
| 3,658,777 | 4/1972 | Green | 260/88.2 R |
| 3,851,015 | 11/1974 | Agouri et al. | 260/878 B |
| 4,370,456 | 1/1983 | George | 526/125 |
| 4,376,191 | 3/1983 | Geck | 526/348.6 |
| 4,434,242 | 2/1984 | Roling et al. | 502/107 |
| 4,508,842 | 4/1985 | Beran et al. | 526/129 |
| 4,540,753 | 9/1985 | Cozewith et al. | 526/88 |
| 4,559,318 | 12/1985 | Smith et al. | 502/110 |
| 4,672,096 | 6/1987 | Nowlin | 526/116 |

OTHER PUBLICATIONS

Chemical Abstracts, 95(16), 134123n, (Light Stabilization Mechanism of Dialkylmetal Dithiocarbamates in Polydienes dated 1981).
Chemical Abstracts, 91(18), 141312u, (Elimination and Replacement of Organometallic Co-Catalysts during Polymerization of Propene with Heterogeneous Ziegler-Natta Catalysts dated 1979).
Chemical Abstracts, 84(18), 122427z, (Effects of Diethylzinc in Alkyllithium-Initiated Polymerizations dated 1976).
Chemical Abstracts, 84(4), 17812y, (Polymerization of Vinyl Monomers Initiated by the Diethylzinc-Organic Peroxides or Hydroperoxides Systems dated 1975).
Chemical Abstracts, 99(20), 158894y, (Polymerization of 3-Methyl-1-pentene: Enantiospecificity and Diastereospecificity dated 1983).
Chemical Abstracts, 97(2), 6826y, (Isotactic Polymerization of Propene: Stereoregularity of the Insertion of the First Monomer Unit as a Fingerprint of the Catalytic Active Site dated 1982).
Chemical Abstracts, 91(18), 141286p, (Mechanism of Ziegler-Natta Polymerization—Role of the Organometallic Compound during Polymerization dated 1979).
Chemical Abstracts, 69(18), 67786d, (Polymerization of Cyclobutene Rings dated 1968).
Chemical Abstracts, 66(14), 55821m, (Ziegler Polymerization of Olefins dated 1965).
Chemical Abstracts, 69(6), 19583p, (Polymerization and Cyclopropane Formation in the Reaction of Olefins with Diethylzinc and Methylene Iodide dated 1968).
Chemical Abstracts, 77(6), 35149x, (Stereoregularity of Polypropylene from IR and NMR Data dated 1972).
Chemical Abstracts, 75(8), 49721y, (Polymerization of Diene Hydrocarbons under the Action of the .alpha.-titanium Trichloride-Diethylzinc Catalytic System dated 1971).
Chemical Abstracts, 76(2), 4220p, (Polymerization of Ethylene and Butadiene on Dry Combined Catalysts (List continued on next page.)

Primary Examiner—Joseph L. Schofer
Assistant Examiner—Tom Weber
Attorney, Agent, or Firm—J. S. Piscitello

[57] ABSTRACT

An improved polymerization process for making essentially non-agglomerated ethylene polymers, especially EPR polymers, based on the use of a high activity vanadium catalyst, which utilizes an alkylated metal chain transfer agent to moderate the kinetics of the polymerization reaction so as to avoid formation of an undesirable amount of agglomerated polymer.

3 Claims, 3 Drawing Sheets

OTHER PUBLICATIONS

Prepared from .alpha.-titanium Trichloride dated 1971).

Chemical Abstracts, 80(12), 60266c, (Use of Diethylzinc in Olefin Polymerization Catalytic System dated 1973).

Chemical Abstracts, 75(18), 110640q, (Polymerization, Copolymerization, and Terpolymerization of 1-isopropylidene-dicyclopentadiene by Anionic Coordination Catalysts dated 1971).

Chemical Abstracts, 73(26), 131398r, (Novel Syntheses and Polymerizations of Olefinic Episulfides dated 1969).

Chemical Abstracts, 105(22), 191647k, (High-Activity Mixed Metal Alkyl Cocatalysts for .alpha.-olefin Polymerization dated 1986).

Chemical Abstract, 79(14), 79314t, (Synthesis and Characterization of PE-PMMA [polyethylene-poly(methyl methacrylate)] Block Copolymers dated 1973).

Chemical Abstracts, 77(8), 48895n, (Diethylzinc/Nitromethane System as a Catalyst for Polymerization of Olefin Oxides dated 1972).

Chemical Abstracts, 72(20), 101246b, (Ethylene and Propylene Copolymers dated 1970).

Carrick et al., *JACS*, vol. 82, p. 1502 (1960).

Karol et al., *JACS*, vol. 83, pp. 2654–2658 (1961).

PROCESS FOR MAKING EPR RESINS

BRIEF DESCRIPTION OF THE INVENTION

This invention relates to an improved polymerization process for making ethylene polymers, especially EPR polymers, based on the use of a high activity vanadium catalyst, which utilizes a select class of metal alkyl chain transfer agents to moderate the kinetics of the polymerization reaction while providing superior catalyst activity.

BACKGROUND OF THE INVENTION

It is well known that the molecular weight of ethylene polymers can be controlled by the use of chain transfer agents. The much preferred chain transfer agent employed by the art is hydrogen and for a number of good reasons. It is a relatively cheap gas that is easily fed in controlled concentrations with ethylene to the reactor. Other choices of chain transfer agent include metal alkyl compounds. They are disadvantaged by having to be added to the reactor as liquids, typically dissolved in volatile solvents, which can introduce a volatility problem to the reaction system. As a result, they are more difficult to meter to the reaction. They are also more expensive than hydrogen and they contribute metal contaminant to the ethylene polymer. Most importantly, hydrogen is a superior chain transfer agent.

It is also well known that chain transfer agents affect ethylene polymerization catalyst activities. However, this effect differs among the chain transfer agents and is dependent upon the selected catalyst system. Chain transfer agents can reduce catalyst activity, and the extent of such reduction is dependent upon the chain transfer agent chosen and the catalyst system. Higher activity catalysts can be correlated with higher productivities of ethylene polymer. So, it follows that when chain transfer agents are used, an objective is to achieve as high a level of catalyst activity as possible within the framework of the molecular weight targets of the polymerization reaction. A chain transfer agent system that enhances the activity of the catalyst over that achievable with hydrogen would have significant value to the art.

There is a family of high activity vanadium catalysts that have been described for the polymerization of olefins such as ethylene and α-olefins, that are based on the use of a supported reduced and complexed vanadium halide catalyst precursor. Illustrations of these catalysts can be found in Beran et al., U.S. Pat. No. 4,508,842, patented Apr. 2, 1985. Beran et al. described an ethylene polymerization catalyst comprising a supported precursor of a vanadium halide/electron donor complex and alkylaluminum or boron halides to form a reduced vanadium catalyst precursor, which when combined with alkylaluminum cocatalyst and alkyl halide promoter, provides enhanced polymerization and productivity plus a superior polyethylene product. According to Beran et al., the process involves polymerizing ethylene with or without at least one $C_3$ to $C_{10}$ alpha-olefin monomer in the gas phase at a temperature between about 30° C. to about 115° C. wherein the monomers are contacted with a catalyst composition comprising a vanadium complex and a modifier which are impregnated on a solid, inert carrier. Beran et al. differentiate by the use of a supported precursor, a cocatalyst and a promoter in which the supported precursor comprises a vanadium halide-electron donor reaction product and modifier impregnated on a solid, inert carrier. The halogen in the vanadium halide is chlorine, bromine or iodine, or mixtures thereof. A particularly preferred vanadium halide is a vanadium trihalide, such as vanadium trichloride, $VCl_3$. The electron donor is a liquid, organic Lewis base in which the vanadium halide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, such as tetrahydrofuran ("THF"). Between about 1 to about 20, preferably between about 1 to about 10, and most preferably about 3 moles of the electron donor are complexed with each mole of vanadium used.

The disclosure of Beran et al. is incorporated herein by reference. The vanadium catalysts of Beran et al. are hereinafter characterized as the "Beran et al. Catalyst System."

Cozewith et al., U.S. Pat. No. 4,540,753, patented Sep. 10, 1985, disclose a process for making EPR and EPDM resins or elastomers utilizing a catalyst system that comprises a hydrocarbon-soluble vanadium compound in which the vanadium valence is 3 to 5 and an organo-aluminum compound, at least one of the vanadium compound/organo-aluminum pair selected must also contain a valence-bonded halogen. The vanadium compounds are vanadium oxy halide, vanadium halides and complexes of a Lewis base capable of making hydrocarbon-soluble complexes with $VCl_3$, such as tetrahydrofuran, 2-methyltetrahydrofuran and dimethyl pyridine. Illustrative examples of vanadium compounds are vanadyl trihalides, alkoxy halides and alkoxides such as $VOCl_3$, $VOCl_2(OBu)$ where Bu=butyl, and $VO(OC_2H_5)_3$, with the most preferred vanadium compounds being $VCl_4$, $VOCl_3$, and $VOCl_2(OR)$. The patent's cocatalyst is preferably an organo-aluminum compound such as $AlR_3$, $Al(OR')R_2$, $AlR_2Cl$, $R_2Al$—$O$—$AlR_2$, $AlR'RCl$, $AlR_2I$, $Al_2R_3Cl_3$, and $AlRCl_2$, where R and R' represent hydrocarbon radicals, the same or different. The most preferred organo-aluminum compound is cited to be an aluminum alkyl sesquichloride such as $Al_2Et_3Cl_3$ or $Al_2(iBu)_3Cl_3$. The reaction is effected in at least one mixfree reactor, with essentially one active catalyst species, using at least one reaction mixture which is essentially transfer agent-free, and in such a manner and under conditions sufficient to initiate propagation of essentially all of the copolymer, chains simultaneously, wherein the copolymer chains are dispersed within the reaction mixture. According to the patentees, > Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors.[1]

[1] It is to be noted that Cozewith et al. describe polymerization in a reaction system where initial catalyst surge is not a problem.

There is substantial literature indicating the creation of a catalytically active vanadium by the reduction of vanadium halides to a reduced, viz. divalent, state. Carrick et al., JACS, vol. 82, p. 1502 (1960) describe the reduction of $VCl_4$ to the divalent state for of a vanadium ethylene catalyst utilizing conventional reducing agents, such as triisobutylaluminum and zinc alkyls. Karol et al., *JACS*, vol 83, pp. 2654-2658 (1961) discuss the partial and total reduction of vanadium halides such as $VCl_4$ to divalent structures and the catalytic activity resulting with respect to the polymerization of ethylene to polyethylene.

Jacob et al., *Z. anorg. allg. Chem.*, 427, pp. 75-84 (1976) illustrate the complexity of such reduction reactions in the presence of THF. From the teachings of Beran et al., the resulting divalent vanadium compounds are complexes which include THF in the structure.

Cumulative to the above, Smith et al., U.S. Pat. No. 4,559,318, patented Dec. 17, 1985, describe a number of procedures for making $VX_2$, where X is halogen, which involves the reduction of $VX_4$ or $VX_3$ by reaction with reducing agents followed by the complexation of the $VX_2$ with an ether such as THF. Such is effected on a support surface. Also, Smith et al. discloses that in forming the catalyst, once the catalyst is combined with the support, the combination is subjected to a reducing agent "using a hydrocarbon soluble reducing agent such as a dialkyl zinc compound..." Smith et al. emphasized reduction with zinc in the following passage to be found at column 3, lines 49-59:

"However, at the least the last part of the reduction is carried out using zinc metal or alkyl zinc compounds of the formula $R_2Zn$ where R is as described above. The preferred material is elemental zinc in a fine powdered form."

According to the patent, the catalysts are useful for the polymerization of ethylene alone or with a variety of 1-olefin monomers to make homopolymers and copolymers. Illustrative of the 1-olefin monomers are one or more of propylene, 1-butene, 1-pentene, 1-hexane and 1-octene.

Roling et al., U.S. Pat. No. 4,434,242 teach chemisorption of a $V^{(I)}$ oxyhalide, such as $O=VCl_4$, vanadium alkoxide or $VCl_4$ onto a metal oxide support having its surface hydroxyl groups reacted away with a substantially stoichiometric amounts of Group 13[2] metal (i.e., Al, Ga) alkyl, followed by further treatment with an alcohol to narrow the molecular weight distribution of the resultant polymer.

[2] New notation of the Periodic Table Of The Elements, see *Chemical and Engineering News*, 63(5), 27, 1985); as noted in *CRC Handbook of Chemistry and Physics*, 67th Edition, CRC Press Inc., Boca Raton, Fla., inside frontcover.

A number of significant problems have been noted with the fluid bed operability of high activity vanadium catalysts, including the vanadium catalyst encompassed by the Beran et al. Catalyst System, in the polymerization of ethylene and α-olefins to produce elastomeric polymers, such as ethylene-propylene copolymers (EPR). These problems are oftentimes characterized by the formation of polymer chips, chunks, sheets and lumps in the fluid bed, which in some cases can lead to sudden defluidization. Another set of problems can occur with high activity vanadium catalysts on starting up of the fluid bed and/or during transitioning of the reactor. For example, startup of a gas-fluidized polymerization reactor goes through a sensitive stabilization period due to impurities trapped in the reaction system. Low (ppm) level impurities have a deactivating influence on the catalyst and contribute to polymer particle adhesion. The net effect is that layers of polymer fines containing high concentrations of catalyst are formed on reactor surfaces and in places where mixing forces are reduced. When polymerization is then initiated, localized hot spots can result, with consequent chunking and eventual reactor shutdown.

Although such difficulties have occurred in a variety of ethylene polymerization operations with such catalysts, they have been most pronounced under EPR operating conditions, especially under EPM operating conditions, where there are relatively high concentrations of propylene in the reactor and a low-crystallinity resin is being produced. In this case, these difficulties are believed to stem from a number of contributing factors, such as (i) the magnitude of the initial kinetic spike in the standard catalyst reaction profile, which is much greater with propylene as a comonomer than with α-olefins higher than propylene and (ii) the elastomeric nature of the EPM resin being produced, which can soften, become sticky and agglomerate due to the increase in temperature associated with hot spots and reaction surges.

Important variables in influencing the degree of stickiness leading to more or less agglomeration are the polymerization reaction temperature and crystallinity of the polymer being produced. Higher temperatures increase the propensity to form agglomerates, and less crystalline polymers, such as ultra low density polyethylene, ethylene/propylene copolymers (EPM), and ethylene/propylene/diene monomer (EPDM), usually display a greater tendency to agglomerate. EPM and EPDM polymers having a density less than 0.88 g/cc are noted for their capacity to soften and agglomerate.

Those polymerization conditions which result in stickiness and agglomeration of the polymer are termed "polymerization conditions that normally would yield an undesirable amount of agglomerated polymer with high activity vanadium catalysts," in order to characterize this invention so as to compensate for the variety of reactants, polymerization conditions and catalyst compositions encompassed herein.

Elastomeric ethylene-alpha-$C_3$-$C_{18}$ olefin copolymers encompass ethylene-propylene copolymers (EPR) (inclusive of EPM or EPDM copolymers), ethylene-butene copolymers, and the like. Illustrative of such polymers are those comprised of ethylene and propylene or ethylene, propylene and one or more dienes. Copolymers of ethylene and higher alpha-olefins such as propylene often include other polymerizable monomers, such as non-conjugated dienes, illustrated by the following:

straight chain acyclic dienes such as: 1,4-hexadiene, 1,6-octadiene, and the like;

branched chain acyclic dienes such as: 5-methyl-1,4-hexadiene, 3,7-dimethyl-1,6-octadiene, 3,7-dimethyl-1,7-octadiene and the mixed isomers of dihydro-myrcene, dihydroocinene, and the like;

single ring alicyclic dienes such as: 1,4-cyclohexadiene, 1,5-cyclooctadiene, 1,5-cyclododecadiene, and the like;

multi-ring alicyclic fused and bridged ring dienes such as: tetrahydroindene, methyltetrahydroindene, dicyclopentadiene, bicyclo(2,2,1)-hepta-2,5-diene, alkenyl, alkylidene, cycloalkenyl and cycloalkylidene norbornenes such as 5-methylene-2-norbornene (MNB), 5-ethylidene-2-norbornene (ENB), 5-propyl-2-norbornene, 5-isopropylidene-2-norbornene, 5-(4-cyclopentenyl)-2-norbornene, 5-cyclohexylidene-2-norbornene, and the like.

Of the non-conjugated dienes typically used to prepare these copolymers, dienes containing a double bond in a strained ring or α position, are preferred. The most preferred dienes are 5-ethylidene-2-norbornene (ENB) and 1,4-hexadiene. The amount of diene, on a weight basis, in the copolymer can range from about 0% to about 20% with about 0% to about 15% being preferred. The most preferred range is 0% to 10%.

The preferred EPR copolymers are copolymers of ethylene-propylene (EPM) or ethylene-propylene-diene (EPDM). The average ethylene content of the copolymer could be as low as about 10% on a weight basis. The preferred minimum is about 25%. A more preferred minimum is about 30%. The maximum ethylene content may be about 85% on a weight basis. The preferred maximum is about 80%, with the most preferred maximum being about 75 weight % ethylene.

High activity vanadium catalysts would be desirable for EPR products because they achieve efficient comonomer incorporation in the polymers with relatively random distribution of the comonomers in the polymer structure. However, their above-noted deficiencies for producing EPR polymers in a fluid bed, such as producing a high initial surge in the polymerization rate which causes exothermic temperature excursions that can soften the polymer in the course of polymerization and foul the bed by virtue of resin agglomeration, thereby degrading fluid bed operability, has impaired their use for such applications. The initial surge is strongest when propylene is one of the comonomers polymerized with ethylene and is present in relatively high concentrations. The problem is magnified in EPR copolymers because of their low softening temperature. Thus, there is a need for a high activity vanadium-based catalyst system that can produce EPR-type polymers at acceptable productivity levels without inducing agglomeration. There is also a need for a high activity vanadium catalyst system that is effective in producing a variety of ethylene-containing polymers with low softening temperatures.

From the various studies done, a correlation is seen to exist between initial kinetic surge in the reaction and agglomeration of polymer particles in the bed. It is thus concluded that moderation of the initial kinetic surge establishes the catalyst system's capability of moderating the agglomeration problem. It would be most desirable to have a catalyst system for the polymerization of ethylene to homopolymers and copolymers, that not only reduces the kinetic surge in the polymerization, but also achieves reasonable superior activities, thereby enhancing the possibility of greater production of polymer of good quality.

THE INVENTION

This invention involves an ethylene polymerization process that uses a high activity vanadium catalyst in combination with a chain transfer agent but does so without significant kinetic surge and significant loss of catalyst activity. The process utilizes a small amount of a molecular weight controlling agent yet avoids the noted difficulties in fluid bed operability of high activity vanadium catalysts under EPR conditions by providing an enhanced catalyst activity and a gradual kinetic profile even when there are relatively high concentrations of propylene in the reactor and a low-crystallinity to wholly amorphous, elastomeric polymer is being produced.

The invention is directed to an improved fluid bed polymerization process for making ethylene polymers of a specific molecular weight by the addition of a chain transfer agent. The process comprises initiating polymerization with a high activity vanadium catalyst fed to a fluid bed, to which is fed gaseous ethylene, under polymerization conditions, and providing in the fluid bed small amounts of a Group 2 or 12 metal alkyl chain transfer agent. The Group 2 or 12[3] metal alkyl chain transfer agent unexpectedly moderates the kinetics of the polymerization in a fashion superior to that achievable with hydrogen as the chain transfer agent. The Group 2 or 12 metal alkyl chain transfer agent provides the concurrent advantage of increasing catalyst activity over that achievable with hydrogen when used as the chain transfer agent for producing a comparable polymer.

[3]New notation of the Periodic Table Of The Elements, see *Chemical and Engineering News*, 63(5), 27, 1985; as noted in *CRC Handbook of Chemistry* and *Physics*, 67th Edition, CRC Press Inc., Boca Raton, Fla., inside frontcover.

The invention relates to an improved fluid bed polymerization process for ultimately making essentially non-agglomerated ethylene polymers, especially ethylene-α-olefin copolymers such as EPR polymers, based on the use of a high activity vanadium catalyst modified by the presence of a small amount of a metal alkyl chain transfer agent, where the metal is from Groups 2 and 12, such as zinc alkyl compounds, and conducted under polymerization conditions that normally would yield an undesirable amount of agglomerated polymer but for the presence of the metal alkyl chain transfer agent. The catalyst used in the fluid bed process of the invention involves modifying high activity vanadium catalysts such as the Beran et al. Catalyst System, by providing with charges of the catalyst, a Group 2 or 12 metal alkyl chain transfer agent, in such amounts and under such conditions, that sudden surges in polymerization are avoided with consequently expected avoidance of an undesirable amount of agglomeration.

The process yields a more active catalyst than is traditionally obtained when hydrogen is used as the chain transfer agent. Other advantages of the process of the invention are (i) the production of EPR products with cure behavior and properties superior to comparable products produced using hydrogen as the chain transfer agent and (ii) in situ neutralization of acidic groups such as Cl⁻ that may be present in the polymer. As a result, the polymers produced according to the invention can possess more stabile viscosity and other properties.

This invention relates to the copolymerization of ethylene and propylene in the presence or absence of another comonomer to form one or more of an EPM, as aforedefined, and an EPDM, as aforedefined, resin, utilizing the catalyst and process of Beran et al. modified by providing with the catalyst in the fluid bed at startup or during catalyst feed to the bed, a small amount of a metal alkyl chain transfer agent wherein the metal is from Groups 2 and 12.

Broadly, this invention is directed to novel moderated catalyst systems with high activities, and to fluid bed processes for the polymerization of ethylene to make ethylene homopolymers and copolymers. The novel catalyst systems of the invention comprise
a supported precursor containing a high activity vanadium catalyst complexed with an electron donor and reduced with a modifier;
an aluminum cocatalyst;

a metal alkyl chain transfer agent where the metal is from Groups 2 and 12 of the Periodic Table Of The Elements, and a halogenated organic promoter.

DETAIL DESCRIPTION OF THE INVENTION

Figure 1:
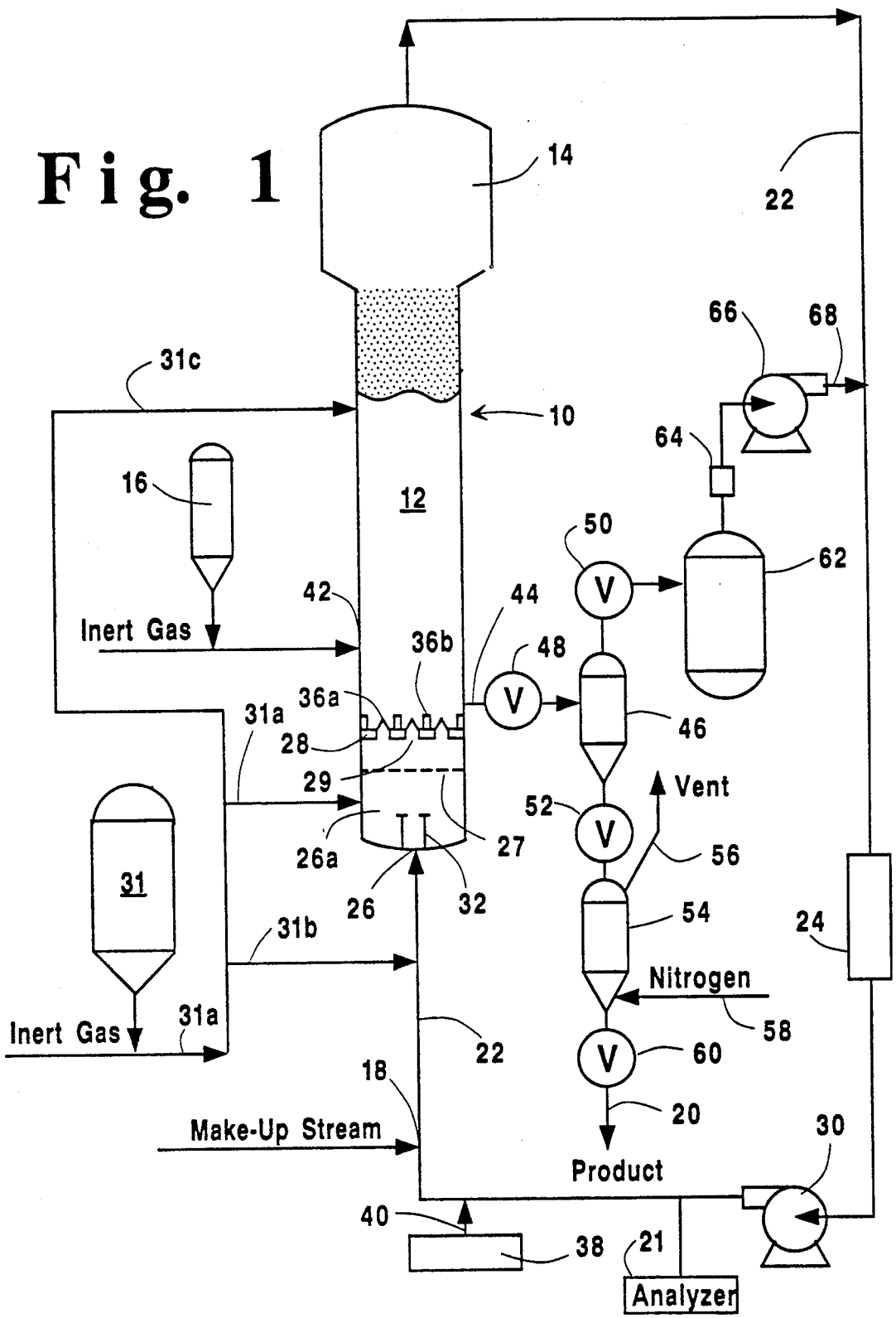
FIG. 1 is a schematic flow drawing of a fluid bed apparatus for carrying out the process of the invention.

This invention introduces a number of significant advantages over the conventional Beran et al. Catalyst System for EPR polymerization. For example, the catalyst system of the invention provides a different kinetic response than a conventionally made Beran et al. Catalyst System and higher activity than a Beran et al. Catalyst System used in combination with hydrogen as the chain transfer agent. Based on prior experiences with systems that reduce kinetic surges, it is reasonable to conclude the invention leads to better reactor operability, less offgrade product, and faster and more trouble-free start-ups of the reactors. This invention provides an unexpected solution to kinetic surge in polymerization of the conventional high activity vanadium catalysts and overcomes the disadvantageous reduction in catalyst activity that is realized from the use of hydrogen as the chain transfer agent with these types of catalysts.

The use of diethyl zinc ("DEZ"), or other metal alkyls recited herein as chain transfer agents, to reduce the molecular weight of a polyolefin resin, is known. However, they are inferior to hydrogen for this purpose. It is known that chain transfer agents, be they hydrides or metal alkyls or hydrogen, can affect catalyst activity, sometimes increasing or decreasing it. Until this invention, chain transfer agents have not been used to regulate polymerization kinetics. The use of metal alkyl chain transfer agents, such as DEZ, in conjunction with high activity vanadium catalyst, results in (i) control of polymerization kinetics while (ii) achieving catalyst activity superior to that which is obtainable when hydrogen is the chain transfer agent.

It has been unexpectedly found that the metal alkyl chain transfer agents, such as diethyl zinc, typically provided with monomer feed to the fluid bed, moderate the initial surge in polymerization of freshly fed high activity vanadium catalysts such as a Beran et al. catalyst system. Yet, they serve to enhance the catalyst's activity in the course of the polymerization, which can reflect in greater productivity of product, when contrasted with the catalyst's activity using hydrogen is the chain transfer agent. Under conditions required to make fractional melt index EPM resins, productivity is nearly 50% greater when using diethyl zinc than when using hydrogen, and there is a complete absence of reaction surge. Also, high activity promoters, such as $CCl_4$, that are normally inoperable due to extreme surging, can be used with DEZ being present, without losing control of the reaction. For example, under conditions required to incorporate moderate amounts of ENB (>3 wt %), productivity is about 15% higher using DEZ instead of hydrogen, and the catalyst undergoes no significant decay over several hours.

The Supported Precursor

The Vanadium Compounds

The supported precursor is a vanadium compound and modifier impregnated on a solid, inert carrier. The vanadium compound in the precursor is the reaction product of a vanadium$^{(+3\ and/or\ +4)}$ halide and an electron donor. The halogen in the vanadium$^{(+3\ and/or\ +4)}$ halide is chlorine, bromine or iodine, or mixtures thereof. A particularly preferred vanadium halide is a vanadium trihalide, such as vanadium trichloride, $VCl_3$. The concentration of vanadium on the supported precursor is sufficient to provide from about 0.25 to about 7.5 weight percent vanadium.

The Electron Donor

The electron donor is a liquid, organic Lewis base in which the vanadium$^{(+3\ and/or\ +4)}$ halide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, preferably between about 1 to about 10, and most preferably about 3 moles of the electron donor are complexed with each mole of vanadium used.

The Solid, Inert Carrier

The carrier is a solid, particulate porous material inert to the polymerization and, desirably, is a silica-, alumina- or aluminosilicate-, i.e., oxides of silicon or aluminum or mixtures thereof, containing material, preferably a siliceous-containing particulate material. Optionally, the carrier may contain additional materials such as zirconia, thoria or other compounds chemically inert to the polymerization. The carrier is used as a dry powder having an average particle size of between about 10 to 250, preferably about 20 to about 200, and most preferably about 30 to about 100 microns. The porous carrier has a surface area of greater than or equal to about 3 and preferably greater than or equal to about 50 m$^2$/g. A preferred carrier is silica having pore sizes of greater than or equal to about 80, and preferably greater than or equal to about 100 angstroms. The carriers for these applications are dried to remove the free water and much of the bound water. Drying the carrier typically requires heating it as a fluid bed using an inert atmosphere such as air, carbon dioxide or nitrogen, for about four (4) hours and longer, such as 6–10 hours, at 600°–800° C., followed by purging with nitrogen.

The amount of carrier used is that which will provide a vanadium content of between about 0.25 to about 7.5 weight percent vanadium on the precursor, and preferably between about 0.5 to about 6.0 weight percent vanadium, and most preferably about 1.0 to about 5.0 weight percent vanadium.

The Modifier

The modifier used in forming the precursor has the formula:

$$MX_aR_{(3-a)} \tag{I}$$

wherein M is either boron or Al and wherein each R is independently alkyl provided that the total number of aliphatic carbon atoms in any one R group may not exceed 14; X is chlorine, bromine or iodine; and a is 1-2 with the provision that when M is boron, a is 3. Preferred modifiers include $C_1$ to $C_6$ alkylaluminum mono- and dichlorides and boron trichloride. A particularly preferred modifier is diethyl aluminum chloride. A total of about 0.15 to about 3.0, and preferably about 0.35 to about 2.5, mmoles of M per gram of precursor may be used.

The Cocatalyst

The cocatalyst has the formula:

$$AlR_3 \quad (II)$$

wherein R is independently alkyl provided that the total number of aliphatic carbon atoms in any one R group may not exceed 14. Preferred cocatalysts include $C_2$ to $C_8$ trialkylaluminum compounds. A particularly preferred cocatalyst is triisobutyl aluminum. Between about 5 to about 1200, and preferably between about 10 to about 200 moles of cocatalyst are used per mole of vanadium.

The Promoter

The promoters used in the practice of the invention are halogenated organic compounds of two types, one which is supplied separately from the precursor, and another which is a molecularly structural component of the precursor and thus is not separately fed to the polymerization reaction, but instead is part of the precursor composition fed to the reaction. The latter is termed a bound promoter while the former is simply termed promoter.

Promoter

The promoter is a halogenated organic compound such as a halohydrocarbon of the formula:

$$R'_b CX'_{(4-b)} \quad (III)$$

wherein R' is hydrogen or unsubstituted or halosubstituted lower alkyl, i.e., up to about $C_6$ containing alkyl; X' is halogen; and b is 0, 1 or 2. Preferred promoters include fluoro, chloro or bromo substituted ethane or methane having at least 2 halogens attached to a carbon atom. Preferred promoters include $CCl_4$, $CHCl_3$, $CH_2Cl_2$, $CBr_4$, $CFCl_3$, $CH_3CCl_3$, and $CF_2ClCCl_3$. Particularly preferred promoters are difluorotetrachloroethane ($CF_2ClCCl_3$), 1,1,1, trichloroethane, ($CH_3CCl_3$), and chloroform ($CHCl_3$). Between about 0.1 to about 10, and preferably between about 0.2 to about 2, moles of promoter are used per mole of cocatalyst.

The Bound Promoter

The promoter may comprise the haloalcohol metalate moiety of the structural formula:

$$-\underset{(|)_x}{Me} + O - R^0R_b \; CX_{(3-b)}^{0})_y \quad (IV)$$

wherein Me is a metal such as those from Groups 1, 2, 12 and 13 (new notation) of the Periodic Table Of The Elements and includes, for example, the alkali metals (lithium, sodium, potassium, rubidium and cesium), the alkaline earth metals (beryllium, magnesium, calcium, strontium and barium), zinc, cadmium, mercury, boron, aluminum, gallium, indium, tantalum, and the like; or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^\diamond$ is hydrogen, unsubstituted or halosubstituted lower alkyl, i.e., up to about $C_6$ containing alkyl, aromatic such as phenyl, benzyl, and the like, or cycloalkyl, b is 0 or 1, $X^0$ is one of chlorine, bromine, fluorine or iodine, and $R^0$ is a divalent organic group bonded to both the O and to the CX' moieties. $R^0$ may be aliphatic or aromatic. Further description of these bound promoters can be found in copending application Ser. No. 502,678, filed Apr. 2, 1990. The description therein of bound promoters is incorporated herein by reference.

The Metal Alkyl Chain Transfer Agent

Illustrative chain transfer agents are those of the formula:

$$(R^\blacklozenge)_{\partial}M \quad (V)$$

wherein $R^\blacklozenge$ is an alkyl of 1 to about 12 carbon atoms, preferably of 1 to about 6 carbon atoms, [4] M is a metal from the Group 2 and 12 (new notation) of the Periodic Table Of The Elements [5] and includes beryllium, magnesium, calcium, strontium, barium, zinc, cadmium, and mercury. $\partial$ is a number equal to the valence of the metal M.

[4] Such radicals may be cyclic, branched or straight chain, and may be substituted with any substituent which is nonreactive with the catalyst and reactants present in the reactor.
[5] See CRC Handbook of Chemistry and Physics, 67th Edition, CRC Press Inc., Boca Raton, Fla., inside front cover.

Illustrative of suitable metal alkyl chain transfer agents are the following:

| | | |
|---|---|---|
| $(CH_3)_2Zn$ | $(CH_3CH_2CH_2CH_2CH_2)_2Hg$ | |
| | | $CH_3$ |
| | | $CH_2$ |
| $(CH_3CH_2)_2Zn$ | $(CH_3CH_2CH_2CH_2CH_2)(CH_3)Hg$ | $(CH_3CH)_2Ca$ |
| $(CH_3CH_2CH_2)_2Zn$ | $(CH_3)_2Be$ | $(CH_3CH_2CH_2)(CH_3)Ca$ |
| $CH_3$ | | |
| $(CH_3CH)_2Zn$ | $(CH_3CH_2)_2Be$ | $(CH_3CH_2CH_2CH_2CH_2)_2Ca$ |
| | $(CH_3CH_2CH_2)_2Be$ | $(CH_3CH_2CH_2CH_2CH_2)(CH_3)Ca$ |
| $CH_2$ | $CH_3$ | |
| $(CH_3CH)_2Zn$ | $(CH_3CH)_2Be$ | $(CH_3)_2Sr$ |

-continued

| | | |
|---|---|---|
| (CH₃CH₂CH₂)(CH₃)Zn | | (CH₃CH₂)₂Sr |
| (CH₃CH₂CH₂CH₂CH₂)₂Zn | CH₃<br>CH₂<br>(CH₃CH)₂Be | (CH₃CH₂CH₂)₂Sr |
| (CH₃CH₂CH₂CH₂CH₂)(CH₃)Zn | (CH₃CH₂CH₂)(CH₃)Be | CH₃<br>(CH₃CH)₂Sr |
| (CH₃)₂Cd | (CH₃CH₂CH₂CH₂CH₂)₂Be | |
| (CH₃CH₂)₂Cd | (CH₃CH₂CH₂CH₂CH₂)(CH₃)Be | CH₃<br>CH₂<br>(CH₃CH)₂Sr |
| (CH₃CH₂CH₂)₂Cd | (CH₃)₂Mg | (CH₃CH₂CH₂)(CH₃)Sr |
| CH₃<br>(CH₃CH)₂Cd | (CH₃CH₂)₂Mg | (CH₃CH₂CH₂CH₂CH₂)₂Sr |
| | (CH₃CH₂CH₂)₂Mg | (CH₃CH₂CH₂CH₂CH₂)(CH₃)Sr |
| CH₃<br>CH₂<br>(CH₃CH)₂Cd | CH₃<br>(CH₃CH)₂Mg | (CH₃)₂Ba |
| (CH₃CH₂CH₂)(CH₃)Cd | | (CH₃CH₂)₂Ba |
| (CH₃CH₂CH₂CH₂CH₂)₂Cd | CH₃<br>CH₂<br>(CH₃CH)₂Mg | (CH₃CH₂CH₂)₂Ba |
| (CH₃CH₂CH₂CH₂CH₂)(CH₃)Cd<br>(CH₃)₂Hg | (CH₃CH₂CH₂)(CH₃)Mg | |
| (CH₃CH₂)₂Hg | (CH₃CH₂CH₂CH₂CH₂)Mg | CH₃<br>(CH₃CH)₂Ba |
| (CH₃CH₂CH₂)₂Hg | (CH₃CH₂CH₂CH₂CH₂)(CH₃)Mg | CH₃<br>CH₂<br>(CH₃CH)₂Ba |
| | (CH₃)₂Ca | (CH₃CH₂CH₂)(CH₃)Ba |
| CH₃<br>(CH₃CH)₂Hg | (CH₃CH₂)₂Ca | (CH₃CH₂CH₂CH₂CH₂)₂Ba |
| CH₃<br>CH₂<br>(CH₃CH)₂Hg | (CH₃CH₂CH₂)₂Ca | (CH₃CH₂CH₂CH₂CH₂)(CH₃)Ba |
| (CH₃CH₂CH₂)(CH₃)Hg | CH₃<br>(CH₃CH)₂Ca | |

Particularly preferred metal alkyl chain transfer agents are the dialkylzinc compounds such as those illustrated by the formula:

$$R^{\blacklozenge}R^{\square}Zn \quad (VI)$$

wherein $R^{\blacklozenge}$ and $R^{\square}$ are each alkyl of 1 to about 12 carbon atoms, preferably of 1 to about 6 carbon atoms, usually from 1 to 6 carbon atoms. Such radicals may be cyclic, branched or straight chain, and may be substituted with any substituent which is nonreactive with the catalyst and reactants present in the reactor. Illustrative of such radicals are methyl, ethyl, n-propyl, isopropyl, n-butyl, tert-butyl, n-hexyl, n-octyl, n-decyl, and the like.

The metal alkyl chain transfer agent, such as the aforementioned dialkylzinc compound, employed in the process of the present invention should be added to the reaction in an amount sufficient to provide from about 0.0001 mol to about 2.0 mols of the metal alkyl per mol of ethylene and α-olefin fed to the fluid bed. Such metal alkyl compound is usually added to the reactor dissolved in an inert liquid solvent. By an inert liquid solvent is meant a solvent which is nonreactive with the metal alkyl compound as well as the catalyst and reactants present in the reactor during polymerization. Hydrocarbons such as isopentane, hexane, heptane, toluene, xylene and naphtha are preferred for this purpose. Generally, such solutions contain from 1 weight percent to 99 weight percent of the metal alkyl compound, usually from about 2 weight percent to about 25 weight percent of such compound.

The catalyst composition is produced by first preparing the supported precursor. The first step is dependent upon whether the carrier is reacted with the haloalcohol to provide the promoter to the polymerization reaction. If so, that reaction is effected first, and then the carrier with the bonded promoter is combined with the vanadium compound in the conventional manner. For example, in one embodiment, the vanadium compound is prepared by dissolving the vanadium trihalide in the electron donor at a temperature between about 20° C. up to the boiling point of the of the electron donor for a few hours. Preferably, mixing occurs at about 65° C. for about 3 hours. The vanadium compound so produced is then impregnated onto the carrier. Impregnation may be effected by adding the carrier as a dry powder or as a slurry in the electron donor or other inert solvent. The liquid is removed by drying at less than about 100° C. for a few hours, preferably between at about 45° to 70° C. for about 3 to 6 hours. The modifier, either reacted with the haloalcohol or not, is dissolved in an inert solvent, such as a hydrocarbon, and is then mixed with the vanadium impregnated carrier. The liquid is removed by drying at temperatures of less than about 70° C. for a few hours, preferably at about 45° C. for about 3 hours. The cocatalyst and any unbound promoter is added to the supported precursor either before and/or during the polymerization reaction. The cocatalyst is preferably added separately as a solution in inert solvent, such as isopentane, during polymerization.

Polymerization

Polymerization is conducted in the gas phase using well established procedures in the art. It is preferred to polymerize in a dynamic bed mode, such as in a continuous, fluidized bed. Using such a procedure, portions of the catalyst composition and monomers are fed to a reactor vessel from which ethylene polymer product is continuously removed. The density of the ethylene copolymer produced may be varied over a wide range depending upon the amount of alpha-olefin comonomer addition and upon the particular comonomer employed.

The operating temperature will typically range from between about 0° C. to about 115° C. Preferred operating temperatures will vary depending upon the polymer density which is desired. High density polymers of greater than about 0.94 g/cc are produced at operating temperatures of between about 90° to about 110° C., and preferably at about 100° C. Low density polyethylenes ranging in density from about 0.91 to about 0.94 g/cc are preferably produced at an operating temperature of between about 75° to about 90° C. Very low density polyethylenes ranging in density from about 0.88 g/cc to about 0.91 g/cc are preferably produced at an operating temperature of between about 50° C. to about 75° C. EPR polymers are preferably produced at an operating temperature of between about 10° C. to about 80° C. using procedures as described herein. The fluid bed reactor is operated at pressures of up to about 1000 psig and preferably between about 250 to about 500 psig.

The fluid bed reactor may be operated under polymerization conditions that normally would yield an undesirable amount of agglomerated polymer with high activity vanadium catalysts without the presence of the metal alkyl chain transfer agent, and this may include temperature conditions near or below the softening temperature of the polymer particles or above the softening temperature of the polymer particles. In addition, operating at temperature condition above the softening temperature of the polymer particles can be further enhanced by employing inert particulate materials as described in copending application Ser. No. 413,704, filed Sep. 28, 1989, now U.S. Pat. No. 4,994,534, [6] the disclosure of which relating to the use of inert particulate materials is incorporated herein by reference. Other types of conventional reactors for the gas phase production of, for example, polyethylene or ethylene copolymers and terpolymers can also be employed. At the start up, the bed is usually made up of polyethylene granular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, makeup feed, and cycle (recycle) gas, i.e., monomers and, if desired, modifiers and/or an inert carrier gas. A typical cycle gas is comprised of ethylene, nitrogen, metal alkyl chain transfer agent, propylene, cocatalyst, promoter, and optionally, diene monomers.

[6] The inert particulates are introduced at the bottom of the reactor or to the recycle line directed to the bottom of the reactor as described in said copending application or fed directly into the polymer bed. The inert particulate materials that may be employed are materials which are chemically inert to the reaction. Examples of inert particulate materials include carbon black, silica, clays, and other like materials. The amount of inert particulate material utilized typically depends on the choice of material and the polymer being produced. For example, carbon black or silica inert material can be employed in amounts of about 0.3% to about 50% by weight, preferably about 5 to about 30%, based on the weight of the final product produced. When clays are employed, the amount can range from about 0.3% to about 80% based on the weight of the final product, and preferably about 12 to 75% by weight. It is preferred to purge the inert particulate material prior to entry into the reactor with nitrogen gas and heating, to remove traces of moisture and oxygen.

A fluidized bed reaction system which is particularly suited to production of polymers by the practice of the process of the present invention is illustrated in FIG. 1. With reference thereto and particularly to FIG. 1, reactor 10 comprises a reaction zone 12 and a velocity reduction zone 14.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably, the SGV is at least 1.0 ft/sec. above the minimum flow for fluidization, and is preferably from about 1.2 to about 6.0 ft/sec. Ordinarily, the SGV will not exceed 6.0 ft/sec. and it is usually no more than 5.5 ft/sec.

Particles in the bed help to prevent the formation of localized "hot spots" asnd to entrap and distribute the particulate catalyst through the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalyst precursors used are often sensitive to oxygen, thus the catalyst precursor used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 450 to about 2000 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

The compressor 30 and the heat exchanger 24 may be positioned as shown in FIG. 1 or their sequence may be reversed. Make-up fluid can be fed at point 18 via recycle line 22 although it is also possible to introduce make up fluid between heat exchanger 24 and velocity reduction zone 14 in recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the dispenser 38, preferably after the compressor 30.

To ensure complete fluidization, the recycle stream and, where desired, part of the make-up stream are returned through recycle line 22 to the reactor at point 26 below the bed. Preferably, there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fludized bed through a gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector 32 comprises a supported annular disc distanced from the reactor inlet 26 by spacers 32a. It divides the entering recycle stream into a central upward flow stream and an upward peripheral annular flow stream along the lower side walls of the reactor. The flow streams mix and then pass through protective screen 27, the holes or ports 29 of the distributor plate 28 and the angle caps 36a and 36b—which are secured to the upper surface of the distributor plate—and eventually into the fluidized bed.

The central upward flow stream in the mixing chamber 26a assists in the entrainment of liquid droplets in the bottom head or mixing chamber and in carrying the entrained liquid to the fluidized bed section during a condensing mode of reactor operation. The peripheral flow assists in minimizing build-up of solid particles in the bottom head because it sweeps the inner surfaces of the reactor walls. The peripheral flow also contributes to the reatomization and re-entrainment of liquid accumulations at the walls or at the bottom of the diffuser mixing chamber—as might occur when there is a high level of liquid in the recycle stream. The annular deflector 32 permits a reactor to be operated without the problems of liquid flooding or excessive build up of solids at the bottom of the reactor.

The temperature of the bed is primarily dependent on three factors: (1) the rate of catalyst precursor injection which controls the rate of polymerization and the attendant rate of heat generation; (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce bed temperature. The rate of catalyst precursor injection serves to control the rate of polymer production. Control over bed temperature under steady state conditions is effected by constantly removing heat generated by the reaction. "Steady state" defines a state of operation where there is no change in the system with time. The amount of heat generated in the process is balanced by the amount of heat being removed and the total quantity of material entering the system is balanced by the amount of material being removed. As a result, the temperature, pressure, and composition of the system does not change with time. No noticeable temperature gradient exists at the upper portion of the bed. A temperature gradient exists in the bottom of the bed in a layer or region extending above the distributor plate, e.g., for about 6 to about 12 inches, as a result of the difference between the temperature of the inlet fluid and temperature of the remainder of the bed. However, in the portion or region above this bottom layer, bed temperature is essentially constant.

Good gas distribution plays an important role in the efficient operation of the reactor. The fluidized bed contains growing and formed particulate polymer particles, as well as catalyst particles. As the polymer particles are hot and possibly active, they must be prevented from settling, because if a quiescent mass is allowed to exist, any active catalyst present can continue to react and cause fusion of the polymer particles resulting, in an extreme case, in the formation of a solid mass in the reactor which can only be removed with a great difficulty and at the expense of an extended downtime. Since the fluidized bed, in a typical commercial size reactor, may contain many thousand pounds of solids at any given time, the removal of a solid mass of this size would require a substantial effort. It is therefore important to diffuse recycle fluid through the bed at a rate sufficient to maintain fluidization throughout the bed.

Any fluid inert to the catalyst and reactants and which, if a liquid, will volatilize under the conditions present in the fluidized bed, can also be present in the recycle stream. Cocatalyst and promoter (when not bound to the support) are preferably added to the reaction system downstream from compressor 30. Thus the materials may be fed into the recycle system from dispenser 38 through line 40 as shown in FIG. 1.

The fluid bed reactor may be operated at pressures of up to about 1000 psig. The reactor is preferably operated at a pressure of from about 250 to about 500 psig, with operation at the higher pressures in such range favoring heat transfer since an increase in pressure increases the unit volume heat capacity of the gas.

The catalyst precursor is injected intermittently or continuously into the bed at a desired rate at a point 42 which is above the distributor plate 28. Preferably, the catalyst precursor is injected at a point in the bed where good mixing with polymer particles occurs. Injecting the catalyst precursor at a point above the distributor plate is an important feature for satisfactory operation of a fluidized bed polymerization reactor. Since catalysts are highly active, injection of the catalyst precursor into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots." Injection of the catalyst precursor into the reactor is preferably carried out in the lower portion of the fluidized bed to provide uniform distribution and to minimize catalyst carryover into the recycle line where polymerization may begin and plugging of the recycle line and heat exchanger may eventually occur.

Inert particulate materials are optionally introduced into the reactor from vessel 31 through line 31a together with inert gas or alternatively through 31b where it is joined with recycle line 22 or alternatively through 31c directly into the bed. More than one introduction point may be used during normal operation.

A gas which is inert to the catalyst, such as nitrogen or argon, is preferably used to carry the catalyst precursor and the optional inert particulate material into the bed.

The rate of polymer production in the bed depends on the rate of catalyst precursor injection and the concentration of monomer(s) in the recycle stream. The production rate is conveniently controlled by simply adjusting the rate of catalyst precursor injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst precursor injection.

On discharge of particulate polymer product from the reactor 10, it is desirable, and preferable, to separate fluid from the product and to return the fluid to the recycle line 22. There are numerous ways known to the art to accomplish this. One system is shown in FIG. 1. Thus, fluid and product leave the reactor 10 at point 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into the product surge tank 54. The product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from product discharge tank 46 is directed through surge tank 66 and thence through a filter 64, a compressor 66 and into recycle line 22 through line 68.

In a typical mode of operation, valve 48 is open, and valves 50 and 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas preferably nitrogen, which enters the product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. The valves can be kept substantially free of agglomerated particles by installation of means for directing a stream of gas periodically through the valves and back to the reactor.

EXAMPLES

Precursor Preparation Procedure

To a vessel containing anhydrous THF is added sufficient $VCl_3$ to produce a solution containing 0.08 millimole V/g solution. The mixture is stirred at reflux for 4 hours under a nitrogen blanket to dissolve all the $VCl_3$. To this solution is added sufficient silica (dehydrated by heating to 600° C.) to give a vanadium content of 0.30 millimole/g, and stirring is continued for 30 minutes at 60° C. The pressure in the vessel is then reduced to 300 mm Hg, and the solution dried to the mud stage at 70° C. A nitrogen purge is then applied for several hours, resulting in a free-flowing solid catalyst precursor complex. This solid is removed from the vessel and stored under nitrogen.

The modifier is introduced by slurrying the dried precursor complex in isopentane under a nitrogen blanket. Diethylaluminum chloride (DEAC), as a 10% solution, is then added in sufficient amount to provide the desired aluminum content (Al/V=4.5 in the case of Examples 1–5, infra, and Al/V=6.0 in the case of Examples 6–10, infra). The mixture is stirred at 30° C. for 60 min, and then dried as above at a jacket temperature of 55° C. until the product is a free-flowing solid. This solid is removed from the vessel and stored under nitrogen.

If a second modification step is desired, the above catalyst precursor is reslurried in isopentane, additional diethylaluminum chloride added, and the mixture again dried to a free-flowing powder and stored under nitrogen.

Polymerization Procedures Of The Examples

A 1-liter autoclave reactor is initially purged with nitrogen and heated to an internal temperature of 100° C. for at least 15 minutes under a slow, continuous nitrogen purge. The reactor is then cooled to 85° C. and 200 grams of dehydrated sodium chloride (dried under vacuum at 115° C. for at least 12 hours) is taken from a vacuum oven while hot and added to the reactor through a ⅛ inch port under a nitrogen flow. The salt bed is stirred at 300 rpm and purged with nitrogen for an additional 15 minutes. The reactor jacket is then cooled to 6°–8° C.

At a jacket temperature of 10° C., approximately 0.017 millimole of catalyst precursor is added to the reactor via the ⅛ inch port from a standard catalyst precursor addition tube while maintaining very slow stirring. Triisobutylaluminum (TIBA), as a 25 weight percent solution in hexane, and CHCl$_3$, as a 1M solution in hexane, are then charged to a nitrogen-purged 4 oz bottle in a 50:1 Al/V mole ratio and a 1:1 Al/CHCl$_3$ mole ratio, along with sufficient additional hexane to make a total of 7 ml of liquid. At a reactor jacket temperature of 15° C., this mixture is charged to the reactor and the ⅛ inch port is tightly capped. The reactor is purged briefly with nitrogen through the vent line, sealed and the stirring speed increased to 300 rpm.

A mixture of ethylene, propylene, hydrogen (in the case of Examples 1 and 6, infra), and ENB (in the case of Examples 6–10, infra) with a C$_3$/C$_2$ mole ratio of 0.40 (in the case of Examples 1–10, infra), a H$_2$/C$_2$ mole ratio of 0.002 in the case of Examples 1 and 6, infra, and 0.5 ml initial charge of ENB, in the case of Examples 6–10, infra, is fed to the reactor at an ethylene flow of 3 liters/min until the reactor pressure reaches the preset limit of 120 psig, at which point the flow drops momentarily to near zero. As polymerization commences, both flow and internal temperature increase. At this point, the hydrogen is turned off, the C$_3$/C$_2$ mole ratio is adjusted downward to a value of 0.23, and the jacket temperature is adjusted to bring the internal temperature to 30° C. (in the case of Examples 1–5) and to 40° C. (in the case of Examples 6–10). The gas mixture is fed on demand for 60 minutes for Examples 1–9, and 3 hours in the case of Example 10, and the reaction is then terminated by stopping the monomer flow. The ethylene flow as a function of time (kinetic profile) is monitored and recorded throughout the runs.

Figure 2:
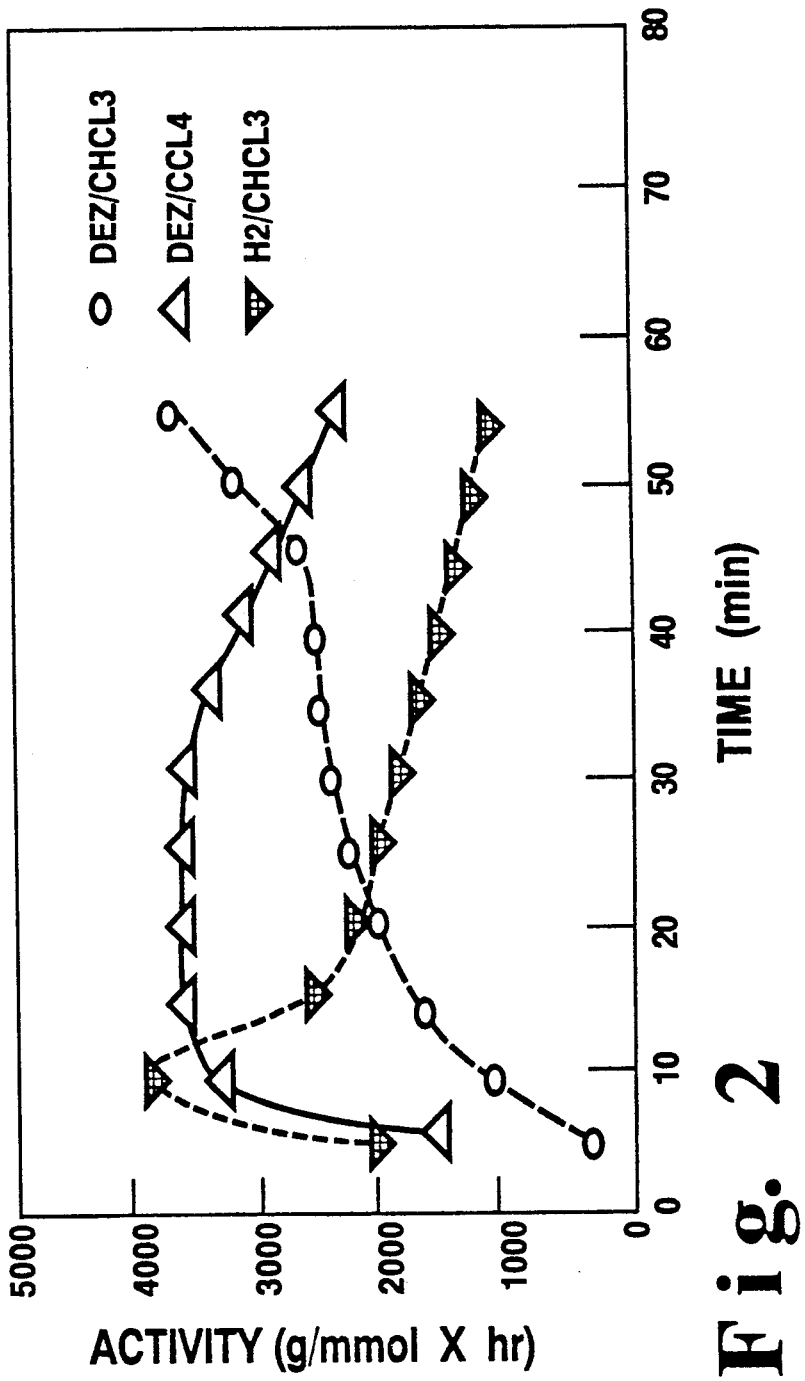
FIG. 2 illustrates the kinetic profile of a typical EPM polymerization employing hydrogen as the chain transfer agent and the use of an metal alkyl chain transfer agent in accordance with this invention.

FIG. 2 shows the kinetic profile of a typical EPM polymerization employing hydrogen as the chain transfer agent. The total productivity at the end of a 1 hour polymerization is indicated in Table I, along with the melt index of the resulting resin. Of particular note is the rapid initial surge in catalyst activity when using hydrogen as the chain transfer agent, followed by rapid decay to a much lower level of activity. The surge can cause a loss of control of the reaction temperature and makes the reactor difficult to operate. The decay leads to poor overall productivity. This is in contrast to the runs employing diethyl zinc as the chain transfer agent. Here, the activity increases only slowly with time, making the reactor easy to control, and decay takes much longer to set in, increasing productivity. With CHCl$_3$ as a promoter, activity is still increasing after 1 hour and decay has not yet begun. With CCl$_4$ as promoter, the rise is more rapid, but not uncontrollable, and decay begins after about 40 minutes. The same CCl$_4$-promoted reaction with hydrogen results in an uncontrolled reaction.

As seen in Table I, low levels of diethyl zinc cause the total productivity of EPM polymerizations to double. However, little chain transfer takes place under these conditions, and the melt index is not measurable. A better comparison is to use enough diethyl zinc to produce resins of a comparable melt index. Under these conditions, total productivity for a one hour polymerization increases approximately 50% over the hydrogen base case, depending on the choice of promoter. For longer polymerizations, the activity advantage of diethyl zinc would be even more due to its lower decay rate.

Figure 3:
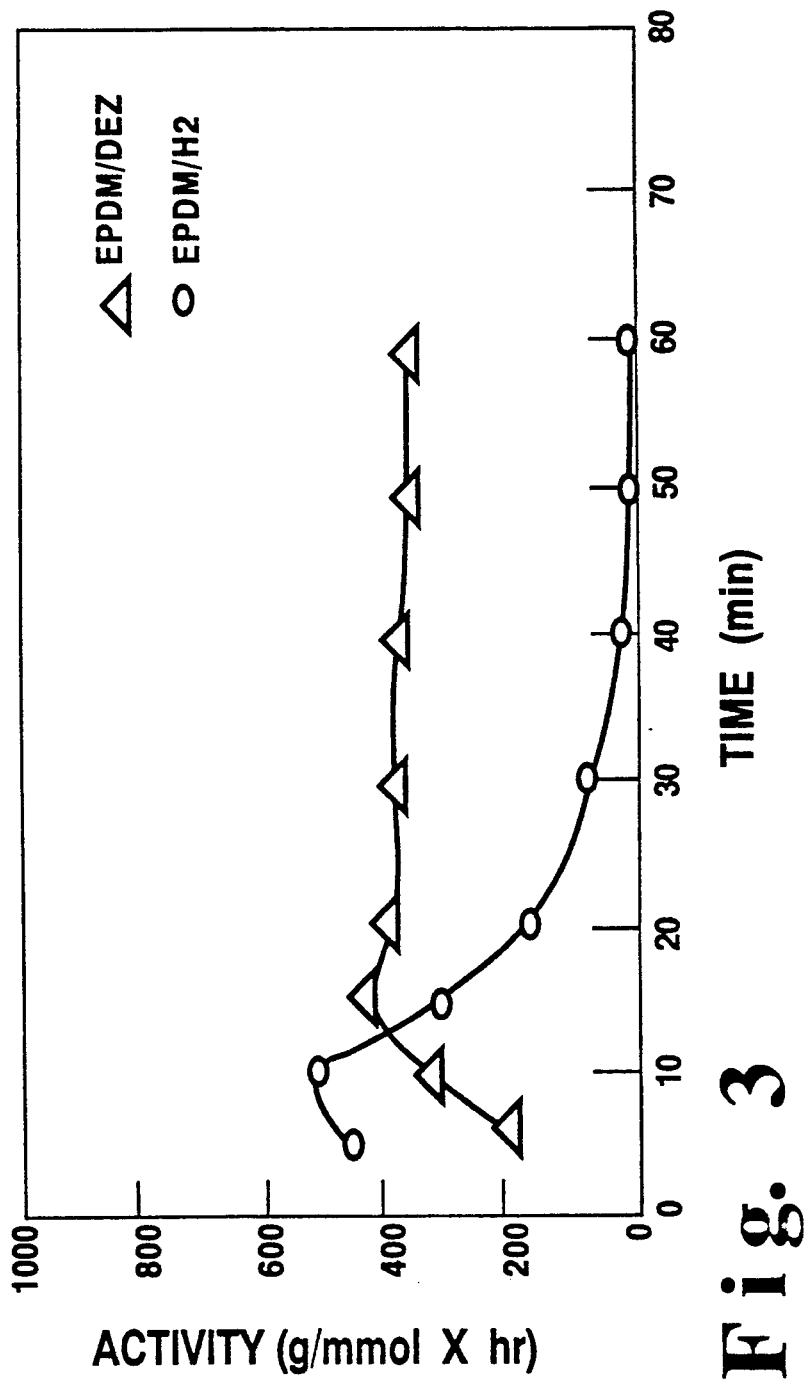
FIG. 3 illustrates the kinetic profile of a typical EPDM polymerization employing hydrogen as the chain transfer agent and the use of metal alkyl chain transfer agent in accordance with this invention.

As shown in Table II and FIG. 3, diethyl zinc causes similar effects vis-a-vis hydrogen in EPDM polymerizations, although the activities and productivities are much lower than for EPM, and are affected by the amount of ENB incorporated. Thus activities must now be compared at constant ENB incorporation. At an ENB incorporation of 4 wt %, overall productivity in one hour polymerizations is about 15% higher using diethyl zinc. This is less than in the EPM case, but still significant. Conversely, if productivity were kept constant, more ENB could be incorporated using diethyl zinc instead of hydrogen. This is illustrated in the Table. The Figure illustrates that in the presence of hydrogen, activity decays to nearly zero after 1 hour, and it is not possible to run a polymerization longer than one hour. However, with diethyl zinc, the kinetic profile is flat, and three hour polymerizations are quite pratical with no loss in productivity. Thus in 3 hour polymerizations, the polymer yield (g polymer/g catalyst) will be three times higher with diethyl zinc than with hydrogen.

TABLE I

EPM POLYMERIZATION RESPONSE USING DIETHYL ZINC (DEZ) FOR CHAIN TRANSFER

| Example No. | H$_2$/C$_2$ Ratio | DEZ/V Ratio | MI | Productivity (g/mmol/hr) | Comments |
|---|---|---|---|---|---|
| 1 | 0.002 | 0 | 0.25 | 2090 | Comparative H$_2$ run |
| 2 | 0 | 5 | NF | 4190 | DEZ run |
| 3 | 0 | 20 | NF | 4100 | DEZ run |
| 4 | 0 | 30 | 0.25 | 2820 | DEZ run |
| 5 | 0 | 30 | 0.25 | 3440 | CCl$_4$ promoter DEZ run |

TABLE II

EDPM POLYMERIZATION RESPONSE USING DIETHYL ZINC (DEZ) FOR CHAIN TRANSFER

| Example No. | H$_2$/C$_2$ Ratio | DEZ/V Ratio | ENB (wt %) | Productivity (g/mmol/hr) | Comments |
|---|---|---|---|---|---|
| 6 | 0.004 | 0 | 4.0 | 350 | Comparative H$_2$ run |
| 7 | 0 | 15 | 4.0 | 400 | DEZ run |
| 8 | 0 | 10 | 4.5 | 375 | DEZ run |
| 9 | 0 | 10 | 3.5 | 600 | DEZ run |
| 10 | 0 | 50 | 4.5 | 375 | 3 hr run DEZ run |

We claim:

1. An improved fluid bed polymerization process for making one of an EPM and an EPDM resin containing from 30% by weight to 75% by weight of ethylene by the addition of a chain transfer agent, which comprises initiating polymerization with a high activity vanadium catalyst fed to a fluid bed, to which is fed gaseous ethylene and propylene in the presence or absence of another comonomer, under polymerization conditions, and providing in the fluid bed, in the absence of hydrogen, small amounts of a dialkyl zinc compound, said high activity vanadium catalyst comprising (a) a supported precursor consisting of a vanadium compound and modifier impregnated on a solid, inert carrier, said vanadium compound being the reaction product of a vanadium trihalide and an electron donor, the halogen in said vanadium trihalide being chlorine, bromine or iodine, and said modifier having the formula $$MX_aR_{(3-a)}$$

wherein M is either boron or Al and wherein each R is independently alkyl provided that the total number of aliphatic carbon atoms in any one R group may not exceed 14; X is chlorine, bromine or iodine; and a is 1-2 with the provision that when M is boron, a is 3;

(b) a cocatalyst having the formula $$AlR_3$$

wherein R is independently alkyl provided that the total number of aliphatic carbon atoms in any one R group may not exceed 14; and (c) a halogenated organic promoter.

2. The fluid bed polymerization process of claim 1 wherein vanadium trihalide is vanadium trichloride.

3. The fluid bed polymerization process of claim 2 wherein the dialkyl zinc compound is diethyl zinc.

* * * * *